May 9, 1933.  J. H. HAMMOND, JR  1,907,963
SELECTIVE SIGNALING
Filed Feb. 25, 1930  3 Sheets-Sheet 3
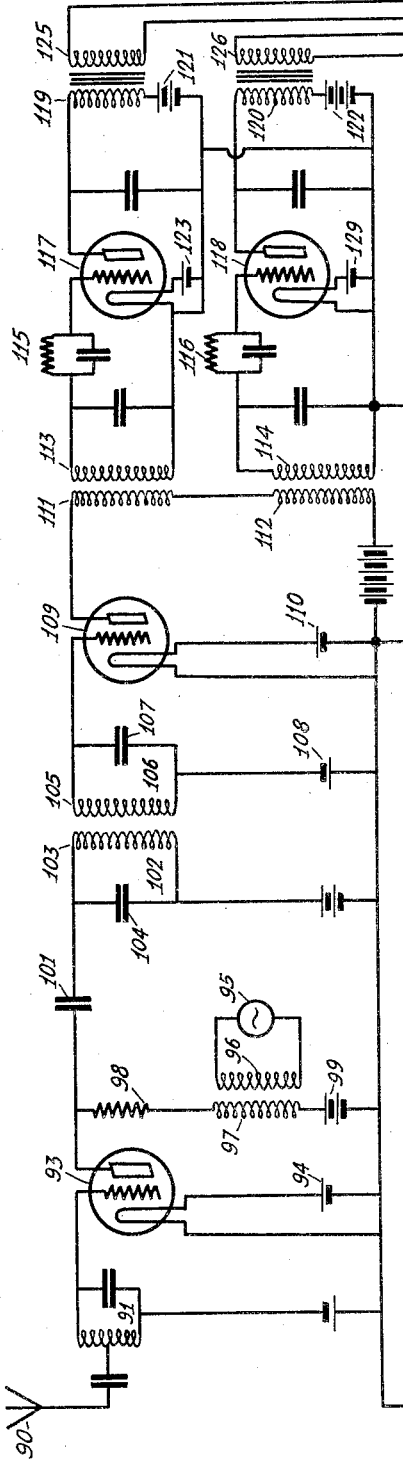
Fig. 3
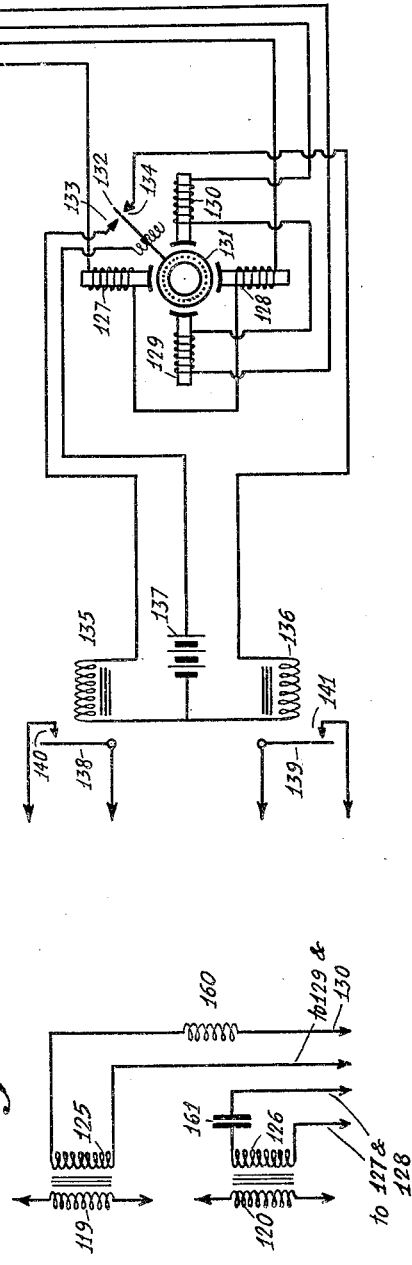
Fig. 3a
INVENTOR
JOHN HAYS HAMMOND JR
BY 
ATTORNEY Patented May 9, 1933

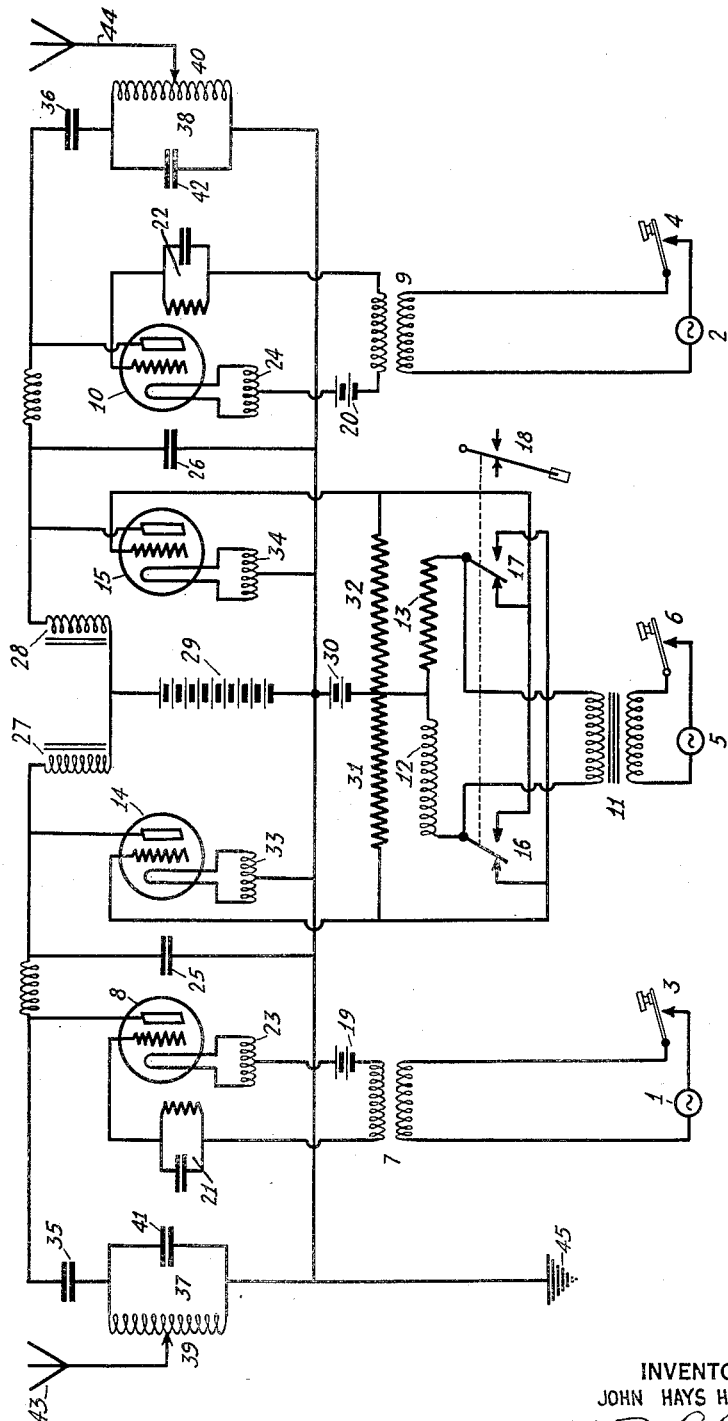

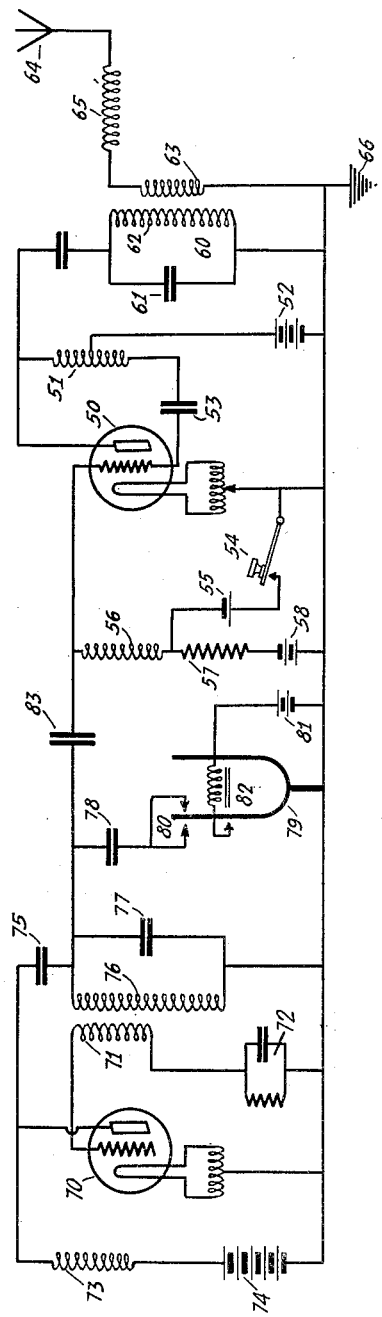
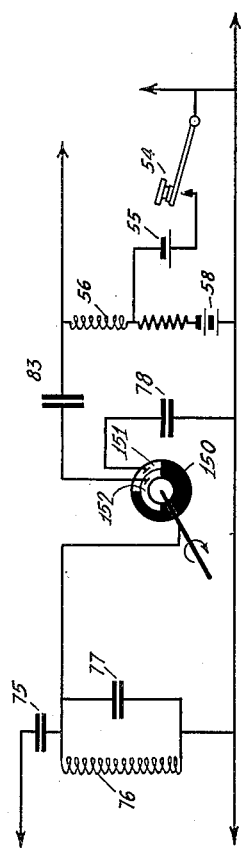
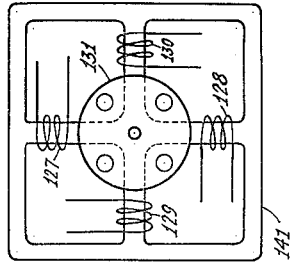
INVENTOR
JOHN HAYS HAMMOND JR.
BY
ATTORNEY

1,907,963

UNITED STATES PATENT OFFICE

JOHN HAYS HAMMOND, JR., OF GLOUCESTER, MASSACHUSETTS

SELECTIVE SIGNALING

Application filed February 25, 1930. Serial No. 431,038.

The object of this invention is to provide an improved system for the transmission and reception of radiant energy.

A further object of this invention is to provide an improved method of transmission and reception of radiant energy.

A more particular object of this invention is to provide an improved system for the transmission of radiant energy whereby secrecy of operation may be maintained and interference may be avoided.

It is a more particular object of this invention to provide an improved group transmission system for transmitting radiant energy.

A still further object of this invention is to provide a selective system for the transmission of radiant energy wherein a plurality of wave trains or source of waves are simultaneously emitted in such a manner that there will be a predetermined difference in the phase of modulation of the different source of waves.

A still further object of this invention is to selectively receive radiant waves of the character described, in such a manner as to operate a receiving device only as a result of predetermined differences in the phase of the received waves.

Another object of this invention is to provide a system for and method of controlling the motion or rotation of a member at the receiver by the transmitter, such for instance, as synchronized rotation of transmitter and recorder drums in facsimile transmission.

These and further objects of the invention will become apparent from the following specification taken in connection with the appended drawings.

In carrying out the objects of my invention, I produce and radiate two series of radio frequency waves which are modulated by a third series of waves. The modulation is so arranged that a predetermined relation in the phase of modulation exists. This relationship may be either phase opposition or phase quadrature, as will be discussed more fully hereinafter.

In reception the two radio frequency carriers are received and detected and the low frequency energy received from each carrier is compared and arranged to produce a rotating field which, by means of appropriate relay devices may be caused to operate various instrumentalities depending upon the direction of rotation, as produced by the relative phase of modulation of the two carriers.

The details involved in my system are given for the purpose of illustration only, although it is believed that the theory underlying my invention is clearly covered by the above.

Having thus briefly described my invention, attention is invited to the accompanying drawings, in which;

Fig. 1 is a diagram representing a transmitter adapted to radiate two series of waves modulated, in accordance with my invention, in phase quadrature.

Fig. 2 is a diagram representing a transmitter adapted to radiate two series of waves modulated, in accordance with my invention, in phase opposition;

Fig. 2a is a diagram representing the transmitter of Fig. 2, modified to transmit the waves modulated in phase quadrature.

Fig. 3 is a diagram representing a receiver adapted to receive the signals transmitted by the transmitters of Fig. 1 and Fig. 2a, or if appropriately modified, those transmitted by the transmitter of Fig. 2.

Fig. 3a is a diagram representing the modifications necessary to be made to the receiver of Fig. 3 to adapt it to receive the signals radiated by Fig. 2.

Fig. 4 is a modified form of induction type relay.

Particular attention is now invited to Fig. 1 which shows at 1 a high carrier frequency source adapted to be controlled as desired by means of the key 3. The second carrier frequency is generated by the high frequency source 2, which is similarly adapted to be controlled by the key 4. The system of modulation shown is plate modulation, the modulation current being adapted to be furnished by the low frequency source 5 as controlled by the key 6. The modulating current is supplied through the transformer 11 to the grids of the modulator devices 14 and 15, as will be described more in detail hereinafter. The high frequency current generated by the generator 1 is transmitted to the input of thermionic device 8 through the transformer 7. The usual grid leak and grid leak condenser 21 and biasing potential 19 are provided in the grid circuit of said device, the filament of which is adapted to be energized by the secondary 23 of the filament energizing transformer, the primary of which is not shown. Similarly, the high frequency current generated by the generator 2 is impressed upon the grid circuit of the thermionic device 10 through the transformer 9. The grid circuit of the device 10 includes the grid leak and grid leak condenser arrangement 22 and the biasing source 20. The filament of the device 10 is adapted to be energized by means connected to the secondary winding 24.

The grid circuit of the modulator device 14 includes the switch 16 when it is as shown in the left hand position, the inductance 12, the biasing source 30, and the transformer winding 33. The grid circuit of the modulator 15 includes the switch 17, when it is as shown in the left hand position, the resistor 13, the biasing source 30 and the winding 34. For providing a variable potential, the inductance 12 and the resistance 13 are both connected in series across the secondary of the transformer 11. There will thus exist across the inductance, a varying potential which will be 90° out of phase with the varying potential which will exist across the resistor 13. Thus the grids of the modulators 14 and 15 are supplied with the same alternating current at phase quadrature. Provisions are made so that the switches 16 and 17 may be moved to the right simultaneously by means of the control key 18. This will cause the inductance 12 to be in the circuit of the grid of modulator 15, and the resistor 13 to be in the grid circuit of the device 14. Thus the phase of modulation of modulator 14 can be made to change from lagging 90° behind that of modulator 15, to leading the phase of modulation of modulator 15 by 90°, by the operation of the control 18.

The space discharge devices 8 and 14 include in their plate circuits the modulating choke 27 and the high potential source 29; and similarly, the devices 10 and 15 include in their plate circuit the modulating choke 28 and the high potential source 29. For by-passing the high frequency existing in the plate circuit of the devices 8 and 10, they are provided with by-pass condensers 25 and 26 respectively.

The plate circuit of the device 8 includes the condenser 35 and the tuning circuit 37 which comprises the inductance 39 and condenser 41. This circuit is tuned to the frequency produced by the high frequency source 1 and is directly coupled to the antenna circuit which includes the antenna 43, part of the inductance 39 and the ground 45. This antenna circuit is thus adapted to radiate the frequency produced by the source 1 as modulated by the frequency produced by the source 5.

Similarly, the plate circuit of the device 10 includes the condenser 36 and the oscillatory circuit 38, including the inductance 40 and condenser 42. The circuit 38 is adapted to oscillate to the frequency produced by the source 2 and is coupled to the antenna circuit, including the antenna 44, part of the inductance 40 and the ground 45, to cause said circuit to radiate the frequency produced by the source 2 as modulated by the frequency produced by the source 5.

However, the modulation of the radiations radiated from antenna 44 is either 90° ahead or 90° behind the modulation of the high frequency radiated by the antenna 43, depending upon the position of the control key 18.

In case it is desirable to radiate both channels from the same antenna for purposes of space economy, without reaction of one channel upon the other, this may be done by any well known method, as for example, by the system disclosed in Patent #1,601,109 to Chaffee.

Referring now more particularly to Fig. 2, there is shown a circuit for producing and radiating energy of two distinct radio frequencies modulated in phase opposition at a low frequency. To accomplish this, there is provided an oscillator device 70 which has included in its grid circuit an inductance 71 and a grid leak condenser arrangement 72. Inductively related to the inductance 71 is the inductance 76, of the oscillator circuit 76—77, and the condenser 75. There is provided in a parallel plate circuit, the inductance 73 and the high potential source 74.

For varying the frequency of the oscillations produced by the oscillatory circuit, there is provided a condenser 78 which may be connected in parallel with the condenser 77 by means of contacts 80 disposed on the tuning fork 79. For maintaining the tuning fork in operation, there is provided a driving magnet 82 with appropriate contacts and a low potential source 81.

The oscillations produced by the aforementioned oscillator are amplified by the thermionic device 50, the output circuit of which is arranged to be equally resonant to each of the two frequencies produced. The input of the amplifier device includes a biasing arrangement comprising a resistor 57 and the bias source 58 which will impress a bias on the amplifier 50 so as to render it inoperative.

For producing signals, however, there is provided in a shunt circuit, controlled by the key 54, a second biasing source 55 by means of which the bias is rendered correct to cause the amplifier 50 to operate. The output of the amplifier 50 includes the inductance 62 which is inductively related to the inductance 63 included in the antenna circuit 63, 64, 65 and 66.

The operation of this circuit will be described more in detail hereinafter.

Fig. 2a represents a modification of Fig. 2 in which the tuning fork is replaced by a commutator 150. This commutator includes sector 151 which is arranged to control the operation of the condenser 78 and the sector 152 which controls the impressing of the oscillation frequency generated by device 70 upon the amplifier device 50. By this arrangement phase quadrature of modulation is obtained by means of the general circuit shown in Fig. 2 which is for this purpose, except for the portion shown in Fig. 2a, the same as that shown in Fig. 2.

Referring now more particularly to Fig. 3, there is shown a doubly resonant input circuit including the antenna 90, the oscillatory circuit 91 and the ground 100. Reception is by the beat method in the detector 93, which is supplied by the source 95 with the local heterodyne frequency oscillations. The plate circuit of the detector 93 includes the resistance 98, the inductance 97 and the high potential source 99. The inductance 97 is inductively related to the inductance 96, whereby it receives the locally generated oscillations.

The intermediate frequencies, produced by the beat detection, are supplied to the circuit 102 which is resonant to each of the frequencies thus produced, and which is inductively related to the circuit 106 connected to the input of the amplifier device 109. The output of the amplifier device 109 includes inductances 111 and 112 which are inductively related to resonant circuits 113 and 114 which are tuned to the two beat frequencies produced by the beat detection. Circuits 113 and 114 are adapted to supply the second detectors 117 and 118 through the grid leak and grid leak condenser arrangement 115 and 116 respectively. The output of the detector 117 includes the primary 119 and the high potential source 121. The primary 119 is inductively related to the secondary 125 which in connected to the windings 129 and 130 of the two phase induction motor which has a squirrel cage type armature 131.

Similarly, the output of the second detector 118 supplies the windings 127 and 128 of the induction motor through the transformer 120—126.

The rotor 131 of the induction motor has an armature 132 mounted thereon, and is adapted to be maintained in a neutral position by means of a spring. Upon a tendency of the armature to rotate in either direction, contact 133 or 134 is closed which completes the circuits of the relays 135 and 136 respectively, causing the armatures 138 and 139 to be moved, closing contacts 140 or 141. These relays may be adapted to control any given work circuits or work controlling circuits in any desired manner.

Fig. 3a shows a modification of the circuit of Fig. 3 for obtaining phase quadrature with respect to the current in the field windings of the phase relay from signals comprising two radio frequency carriers modulated in phase opposition as would be produced by Fig. 2. For this purpose, an inductance 160 is inserted in the leads from the transformer 119—125 to the coils 129 and 130 of the phase relay, and a condenser 161 is inserted in the lead from transformer 120—126 through the coils 127 and 128 of the phase operated relay. The remainder of the circuit necessary for obtaining phase quadrature operation from phase opposition is the same as shown in Fig. 3.

Fig. 4 shows an induction relay which would be particularly adapted for operation by the circuit of Fig. 3. There is provided a unitary stationary iron field structure 141 upon which the field windings 127, 128, 129 and 130 are placed. The rotor 131 may be made entirely of copper and as only a slight degree of rotation is necessary, the inductors pass through the field structure. The rotor is pivoted to permit oscillation and an armature similar to that of Fig. 3 is provided. The operation of this relay is the same as that of Fig. 3.

It is obvious that the two carrier frequencies may be received and amplified independently using separate antenna systems and amplifiers for this purpose, in a similar manner to that used in the transmitter of Fig. 1.

Having thus described my invention, I will now describe its operation.

The transmitting system of Fig. 1 is arranged for two phase transmission of the modulating tone, using two radio frequency channels radiated from antennae 43 and 44. Radio frequencies are determined by the separate radio sources 1 and 2 which may be keyed independently or may be maintained in operation for keying by some other circuit, as for example, by key 6 with respect to the tone frequency produced in the generator 5. When the key 6 is depressed, the modulation frequency is inserted by means of the transformer 11 into the grid circuits of the tubes 14 and 15 respectively. The grid current flows through inductor 12 and resistor 13 in series, whereby the voltage for operating the grid of 14 with the switches 16 and 17 in the position shown is derived from the induction drop across 12, and is therefore strictly in phase quadrature with the voltage. Voltage impressed upon the grid 15 with the switches 16 and 17 in the position shown, is that produced across the resistance 13 and is therefore strictly in phase with the voltage.

It is to be understood that the impedance of 12 and 13 will be normally equal for the operating modulation frequency. In this way, it is arranged that the two radiant channels are modulated in phase quadrature from the same modulation source 5. Thus with the keys 3, 4 and 6 depressed, and the switch 18 in the position shown, there will be emitted from the antennæ 43 and 44 two radio frequencies modulated in phase quadrature by the same modulating frequency, the phase of modulation of the current emitted by antenna 44 being 90° ahead of that emitted by the antenna 43. Movement of the switch 18 to the right causes each of switches 16 and 17 to move to the right and will cause the voltage on the grid of 14 to be produced by the drop across the resistance 13, whereas the voltage on the grid of 15 will be produced by the drop across the inductance 12, in which case, the phase of modulation of the current emitted from antenna 43 will be 90° in advance of that emitted from the antenna 44. With the key 6 open however, there will be no modulation of either of the carrier frequencies.

The transmitter shown in Fig. 2 is adapted to radiate two frequencies modulated by a lower frequency, but with the phase of modulation in opposition rather than in quadrature. This arrangement uses a master radio frequency circuit and a power amplifier having a double tuning circuit arrangement in its output so that it will be responsive to either of the radio frequencies emitted. Modulation is produced by means of the tuning fork 79 or any other appropriate interrupter. The tuning fork 79 carries contacts which serve to cut in and out of the circuit, the condenser 78 which serves to change the frequency of oscillations of the oscillator 70. The effect of this condenser is to cause the production of radiations at one frequency or the other of which it is desired to radiate, but radiations of both frequencies do not exist at the same time. The effect is the same as if each channel existed separately but was chopped or interrupted at a chopping frequency with 180° difference of phase in chopping. The period of chopping may be conveniently twice the period of the tuning fork, since two contacts may be made for each oscillation and adjustment may be made of the contacts so as to give equal time interval on or off the contacts. This making and breaking of the auxiliary condenser circuit may be arranged, as shown in Fig. 2a, in such a manner as to give phase quadrature of modulation instead of phase opposition by providing, for example, a rotary commutator which makes one channel operative the first quarter of the rotation, and the second channel operative the second quarter of the rotation, and both channels inoperative during the remainder of the rotation. To perform this latter function, it is necessary to provide segment 152 on the commutator for the first and second periods of rotation, which establish an essential connection in the oscillator circuit only during these quarters of the rotation. A segment for the third and fourth quarters of the rotation which would short circuit the output of the oscillator during these quarters of the rotation and thus render it ineffective with respect to the power amplifier might however be substituted to perform the same function.

It is obvious that a transmitter of this type would possess advantages as to simplicity over the type shown in Fig. 1 which latter, however, has the advantage of using more or less pure sine wave modulation.

The arrangement of Fig. 3 is adapted to cooperate with the transmitter of Fig. 1, but by a slight modification as shown in Fig 3a, it may be made to operate in connection with the transmitter of Fig. 2 as shown. This receiver, however, will operate as shown with the transmitter of Fig. 2, if it is modified as shown in Fig. 2a to transmit my phase quadrature modulation.

The incoming frequencies are received on the doubly tuned antenna circuit, and operate the beat detector 93 which is supplied with a local heterodyning frequency by the oscillator 95. This energy is amplified by 109 and selected by circuits 113 and 114 and supplied to the second detectors 117 and 118. In the outputs of these detectors exist currents of the modulation frequency. It is to be understood that these currents will be in phase quadrature with respect to each other in the two outputs. This energy is supplied to the field windings of the squirrel cage type induction motor and thereby produces a rotating field which will cause the rotor to tend to rotate in one direction or the other, and thus close either the contact 133 or the contact 134 depending upon the relative phases of modulation. The closure of the contacts 133 and 134 may be caused to operate relays and thus close contacts 140 or 141 for accomplishing any desired result, such as steering or other control of a dirigible body. It is understood that a change in phase relationship of modulation may be obtained by operation of the lever 18 of Fig. 1 which will thus cause the opening of one contact and the closure of the other. Opening of either of the keys 3, 4 or 6 of the transmitter of Fig. 1 will serve to open both contacts and exert no influence at the receiver. Similarly, failure of either or both of the transmitters of Fig. 1 will result in the opening of both contacts and exert no influence on the apparatus being controlled. This feature constitutes one of the important advantages of the present invention. For instance, a torpedo might remain in motion only when one or the other of contacts 139 and 140 were closed with right and left rudder respectively. Thus failure of control would mean stopping of motion.

It is possible, on the other hand, to operate the squirrel cage type motor as a motor rather than a relay, and to control the apparatus by direct operation of the motor in one direction or the other. It is understood that the actual speed of rotation of the motor can be accurately controlled by the transmitter and this system therefore lends itself to produce synchronized rotation of one machine in respect to the other. Thus if the rotor shaft of the receiver were directly connected to the rudder of a dirigible body and the commutator 150 of Fig. 2a were similarly connected to an indicator rotation of 150 would not only produce rotation of the rudder but a visible indication would be produced.

A plurality of methods of controlling the closure of the contacts, on the other hand, is provided. For instance, with the switch in the position shown and all of the keys 3, 4 and 6 depressed the contact, say 133 is closed, then opening of any of the keys 3, 4 and 6 will serve to open this contact, and with the switch 18 in the opposite position, the contact 134 will be closed, and opening of any of the switches 3, 4 and 6 will serve to open this contact. The same result is obtained by moving the switch 18 into the median position which corresponds to opening the key 6.

Operation of the receiver of Fig. 3 by the transmitter of Fig. 2 is accomplished by placing an inductance in the circuit of secondary 125 and a capacitance in the circuit of secondary 126 as shown in Fig. 3a. This will cause the current flowing in these circuits to be changed from phase opposition to phase quadrature, and this operation of the transmitter 2 will serve to cause rotation in the magnetic field of the relay, and closure of one of the contacts. However, the direction of the rotation of the field cannot in this case be controlled from the transmitter.

In the case the transmitter of Fig. 2 is modified as shown in Fig. 2a however, the receiver of Fig. 3 operates in the same manner as described above, and control of the direction of rotation of the magnetic field, upon control of which the contacts are closed, is determined by the phase relationship of the two frequencies as controlled by the rotating commutator. Reversal of the direction of rotation at the receiver may be produced by a reversing switch placed in the condenser circuits, which will cause in one position, the condenser 78 to be closed by commutator 1; and in the other direction to be closed by commutator 2, or the direction of rotation of commutator 150 may be changed.

Having thus described my invention, attention is invited to the fact that various modifications might be made within its scope and that I am not to be limited by this specific form shown and described for the purpose of illustration only, but by its actual scope as set forth in the appended claims.

I claim:

1. The method of remote control by radiant energy which comprises generating a plurality of series of radiant waves of different frequencies, impressing upon said series a series of periodic amplitude variations having a controllable phase relationship, transmitting said plurality of series of waves thus modulated, receiving said transmission, detecting said waves to reproduce the amplitude variations, separating the various phases of said amplitude variations, and producing controlling current pulses in accordance with said various phase relationships.

2. The method of remote control by radiant energy which comprises generating a plurality of series of radiant waves of different frequencies, impressing upon said series a series of signal controlled amplitude variations having a controllable phase relationship, transmitting said plurality of series of waves thus modulated, receiving said transmission, detecting said waves to reproduce the amplitude variations, separating the various phases of said amplitude variations, reversing the sense of said phase relationship to send a controlling signal and producing controlling current pulses in accordance with said various phase relationships.

3. The method of signal transmission by radiant energy which comprises generating a plurality of series of radiant waves of different frequencies, impressing upon said series a series of periodic amplitude variations having a controllable phase relationship, reversing the sense of said phase relationship to send a signal, transmitting said plurality of series of waves thus modulated, receiving said transmission, detecting said waves to reproduce the amplitude variations, and separating the various phases of said amplitude variations to reproduce said signal.

4. The method of remote control by radiant energy which comprises generating a plurality of series of radiant waves of different frequencies, impressing upon said series a series of periodic amplitude variations having a reversible phase relationship, transmitting said plurality of series of waves thus modulated, receiving said transmission, detecting said waves to reproduce the amplitude variations, separating the various phases of said amplitude variations, and effecting control in accord with said relationship.

5. The method of remote control by radiant energy which comprises generating a plurality of series of radiant waves of different frequencies, impressing upon said series a series of periodic amplitude variations having a reversible phase relationship, transmitting said plurality of series of waves thus modulated, receiving said transmission, detecting said waves to reproduce the amplitude variations, separating the various phases of said amplitude variations, reversing the sense of said phase relationship to send a controlling signal, and effecting controlling current pulses in accord with said relationship.

6. The method of signal transmission by radiant energy which comprises generating a plurality of series of radiant waves of different frequencies, impressing upon said series a series of periodic amplitude variations having a reversible phase relationship, reversing the sense of said phase relationship to send a signal, transmitting said plurality of series of waves thus modulated, receiving said transmission, detecting said waves to reproduce the amplitude variations and separating the various phases of said amplitude variations to reproduce said signal.

7. A system for the transmission of intelligence by radiant energy which comprises, means for generating a plurality of currents of a high carrier frequency, means for generating a current of a low modulating frequency, means for modulating each of said high carrier frequency currents by said modulating frequency current including means for causing said modulation to be in phase relationship, means for radiating the carrier frequency currents thus modulated, means for signaling which comprises means for selectively keying the modulation and radiation of either of said carrier frequency currents, means for interrupting the production of said modulating frequency current, and means for reversing the phase relationship of modulation of each of said carrier frequency currents whereby to transmit signals.

8. A system for the transmission of intelligence by radiant energy which comprises, means for generating a plurality of currents of high carrier frequency, means for generating a current of a low modulating frequency, means for modulating each of said high carrier frequency currents by said modulating frequency current including means for causing said modulation to be in phase quadrature, means for radiating the carrier frequency currents thus modulated, means for signalling which comprises means for selectively keying the modulation and radiation of either of said carrier frequencies, means for interrupting the production of said modulating frequency current, and means for reversing the phase relationship of modulation of each of said carrier frequency currents whereby to transmit signals.

9. A system for the transmission of intelligence by radiant energy which comprises means for generating a plurality of currents of high carrier frequency, means for generating a current of a low modulating frequency, means for modulating each of said high carrier frequency currents by said modulating frequency current including means for causing said modulation to have a phase difference, means for radiating the carrier frequency currents thus modulated, and means for signaling which comprises selective means for keying either the modulation and radiation of each of said carrier frequencies or the production of said modulating frequency, or for reversing the phase relationship of modulation of each of said carrier frequencies whereby to transmit signals.

10. A system for the transmission of intelligence by radiant energy which comprises, means for generating a plurality of currents of high carrier frequency, means for generating a current of a low modulating frequency, means for modulating each of said high carrier frequency currents by said modulating frequency current in phase quadrature, means for radiating the carrier frequency currents thus modulated, and means for signaling which comprises means for interrupting the modulation and for reversing the phase relationship of modulation whereby to transmit signals.

11. A system for the transmission and reception of intelligence by radiant energy which comprises, means for generating a plurality of currents of high carrier frequency, means for generating a current of a low modulating frequency, means for modulating certain of said high carrier frequency currents by said modulating frequency current including means for modulating certain other of said high carrier frequency currents by said modulating frequency current at a different phase than said first modulation, means for radiating the carrier frequency currents thus modulated, means for signaling which comprises means for selectively keying the modulation and radiation of either of said carrier frequency currents, means for interrupting the production of said modulating frequency current, means for reversing the phase relationship of modulation of each of said carrier frequency currents whereby to transmit signals, means for receiving each of the carrier frequency currents, means for detecting each of said currents to reproduce the modulating current, field windings adapted to be energized by each of said detected modulating currents whereby, due to the phase relationship between said modulations a rotating field is produced and relay means controlled by said rotating field whereby change in the phase relationship of modulation at the transmitter is indicated by closure of different contacts by said relay means.

12. A system for the transmission and reception of intelligence by radiant energy which comprises, means for generating a plurality of currents of high carrier frequency, means for generating a current of a low modulating frequency, means for modulating each of said high carrier frequency currents by said modulating frequency current to have a phase difference, means for radiating the carrier frequency currents thus modulated, means for signaling which comprises means for interrupting the modulation and for reversing the phase relationship of modulation whereby to transmit signals, means for receiving each of the carrier frequency currents, means for detecting each of said currents to reproduce the modulating current, field windings adapted to be energized by each of said detected modulating currents whereby, due to the phase relationship between said modulations a rotating field is produced and relay means controlled by said rotating field whereby change in the phase relationship of modulation at the transmitter is indicated by closure of different contacts by said relay means.

13. In a signaling system wherein a plurality of carrier frequency currents are modulated by the same signal energy but at various phase differences and transmitted, a receiver comprising means for receiving each of the carrier frequency currents, means for detecting each of said carrier currents to reproduce the modulating current, field windings constructed and arranged so as to be energized by said detected modulating currents whereby, due to the phase relationship between said modulations a rotating field is produced and means controlled by said rotating field whereby change in the phase relationship of modulation at the transmitter is indicated by closure of different contacts by said means.

14. In a signaling system wherein a plurality of carrier frequency currents are modulated by the same signal energy but at various phase differences and transmitted, a receiver comprising means for receiving each of the carrier frequency currents, means for detecting each of said carrier current frequencies to reproduce the modulating current, and a phase difference indicating means for indicating the phase relationship between said modulations as received on the different carrier currents whereby change in the phase relationship of modulation at the transmitter is indicated by closure of different contacts by said indicating means.

15. In a signaling system wherein a plurality of carrier frequency currents are modulated by the same signal energy but at various phase differences and transmitted, a receiver comprising means for receiving each of the carrier frequency currents, means for detecting each of said carrier currents to reproduce the modulating current, and a phase difference indicating means for indicating the phase relationship between said modulations as received on the different carrier currents.

16. In a signaling system wherein a plurality of carrier frequency currents are modulated by the same signal energy but at various phase differences and transmitted, a receiver comprising means for receiving each of the transmitted carrier frequency currents, means for detecting each of said carrier currents to reproduce the modulating current, and means comprising a phase operated relay arranged so as to be energized by each of said detected modulating currents whereby change in the phase relationship of modulation at the transmitter is indicated by closure of different contacts by said relay.

17. A system by which the rotation of an armature at one point is determined and maintained at a point remote therefrom which comprises means for modulating a plurality of radio frequency currents by a modulating frequency current in phase quadrature, means for transmitting the carrier frequencies thus modulated, means for receiving the carrier frequency currents and detecting to produce the different phase modulating frequency components, a field winding adapted to be operated by each of said modulation components, and a squirrel cage type rotor adapted to be rotated by the rotating field thus produced, whereby the rotation of said rotor is controlled by the frequency of modulation at the remote point.

18. A controlling system by which the rotation of an armature at the receiver is determined and its position maintained at the transmitter which comprises means for modulating a plurality of radio frequency currents by a single modulating frequency current in different phase, means for transmitting the carrier frequencies thus modulated, means for receiving the carrier frequency currents and detecting to produce the different phase modulating frequency components, a field winding adapted to be operated by each of said modulation components, and a squirrel cage type rotor adapted to be rotated by the rotating field thus produced, whereby the rotation of said rotor is controlled by the frequency of modulation at the transmitter.

19. A controlling system by which the rotation of an armature at the receiver is determined and maintained at the transmitter which comprises means for modulating a plurality of radio frequency currents by a single modulating frequency in different phase, means for transmitting the carrier frequency currents thus produced, means for receiving the carrier currents, means for detecting said currents to produce the different phase modulating frequency components, and a synchronous motor the field windings of which are excited by the different components.

20. The steps in a method of signaling which comprise generating a plurality of series of radiant waves of different frequencies, generating a series of signaling waves, producing a plurality of different phase displaced versions of the signaling waves, modulating each series of generated radiant waves separately by an independent phase displaced version of the signaling waves, transmitting said series of waves as thus modulated, receiving the transmitted energy, reproducing therefrom the various phase displaced versions of the signaling waves and utilizing the phase versions as thus derived for producing desired controlling actions.

JOHN HAYS HAMMOND, Jr.